Patented Mar. 30, 1926.

1,578,718

UNITED STATES PATENT OFFICE.

GASTON DE BÉTHUNE AND ROBERT VAHRENKAMPF, OF BRUSSELS, BELGIUM, ASSIGNORS TO SOCIÉTÉ NATIONALE D'INDUSTRIE CHIMIQUE EN BELGIQUE, SOCIÉTÉ ANONYME, OF BRUSSELS, BELGIUM.

METHOD OF PRODUCING ALKALI-METAL SULPHIDES.

No Drawing.  Application filed January 16, 1924.  Serial No. 686,669.

*To all whom it may concern:*

Be it known that we, GASTON DE BÉTHUNE and ROBERT VAHRENKAMPF, both subjects of the King of the Belgians, residing at Brussels, in the Kingdom of Belgium, have invented new and useful Improvements in a Method of Producing Alkali-Metal Sulphides, of which the following is a specification.

This invention has for its object a process for obtaining alkali sulphides and sulphydrates.

It is known that alkali sulphides can be obtained by double decomposition between compounds of the alkali metals and sulphide of barium. It is also known that in certain wet processes for the production of alkali sulphides from alkaline earth sulphides and alkali metal salts it is advantageous to conduct the process in a closed vessel so that it takes place in an atmosphere of hydrogen sulphide formed during the reaction and that in certain cases a sulphydrate may be formed as an intermediate product which can be then converted into sulphide with liberation of hydrogen sulphide.

The process forming the object of this invention also relates to the production of sulphides of the alkali metals by double decomposition of alkali metal compounds derived from mineral acids and sulphide of barium by a humid process and is for the purpose of obtaining alkaline sulphides of a high degree of purity with favourable output. This process which is based also on a double decomposition and the formations of an intermediary salt transformable into sulphide is distinguished from the known methods by the fact that hydrogen sulphide is admitted from an external source and forms the reducing atmosphere in contact with the reaction mixture. By way of example the application of the process to the obtention of sulphide of sodium will be described.

One can, for instance mix, at the temperature of 25° C., a saturated solution of purified sodium nitrate, with a slight excess on the molecular equivalent of purified sulphide of barium, obtained by known methods and finely pounded or in the form of a saturated solution.

The mixture is stirred while being maintained in the atmosphere of hydrogen sulphide, under a pressure of about one atmosphere. The temperature of the mixture is raised to about 110° C. and this temperature is maintained for a quarter of an hour to one hour. The reaction then takes place in the presence of the reducing atmosphere constituted by the hydrogen sulphide.

The reaction having been effected, the mixture is allowed to cool slowly, still protected from the air.

Then the nitrate of barium is separated in the presence of the hydrogen sulphide by means of decantation, straining and washing in the usual manner. The sodium sulphydrate is decomposed by heating with liberation of hydrogen sulphide and production of sulphide of sodium.

Finally the nitrate of barium obtained as a subproduct is purified from all traces of foreign metals and sulphides, by the usual means.

The same process can be employed, with variations of working for the treatment of other compounds of the alkali metals. Thus, for instance, double decomposition can be effected by beginning with sulphate, carbonate, chlorate, etc., with production of the corresponding barium salts.

In a general way, the higher the degree of insolubility of the barium salt formed, the easier will be the separation of the products of the reaction.

The addition of a small quantity of carbon disulphide at the time of the treatment, assists the separation of the products of the reaction.

The solvent can be of any kind, subject to its being suited to the reagents.

The process may be stopped at the production of alkali sulphydrate.

Having now particularly described and ascertained the nature of our said invention and in what manner the same is to be performed, we declare that what we claim is:—

1. The process of obtaining sulphides of alkali metals which comprises creating a reducing atmosphere of hydrogen sulphide from an external source and effecting in said atmosphere a double decomposition of compounds of the alkali metals derived from mineral acids and sulphide of barium to produce a sulphydrate.

2. The process of obtaining sulphides of alkali metals which comprises creating a reducing atmosphere of hydrogen sulphide from an external source and effecting in said atmosphere a double decomposition of compounds of the alkali metals derived from mineral acids and sulphide of barium to produce a sulphydrate, and then converting the sulphydrate into sulphide with liberation of hydrogen sulphide.

3. The process of obtaining sulphides of alkali metals which comprises stirring in a closed vessel a saturated solution of an alkali metal compound derived from a mineral acid and sulphide of barium, and admitting to the vessel hydrogen sulphide from an external source to provide a reducing atmosphere, continuing the decomposition until alkali sulphydrate is produced.

4. The process of obtaining sulphides of alkali metals which comprises stirring in a closed vessel a saturated solution of an alkali metal compound derived from a mineral acid and sulphide of barium, admitting to the vessel hydrogen sulphide from an external source to provide a reducing atmosphere, continuing the decomposition until alkali sulphydrate is produced, and then converting the sulphydrate into a sulphide with liberation of hydrogen sulphide.

5. The process of obtaining sulphides of alkali metals which comprises stirring in a closed vessel a saturated solution of an alkali metal compound derived from a mineral acid and sulphide of barium, admitting to the vessel hydrogen sulphide from an external source, raising the temperature to effect the reaction in the reducing atmosphere, then cooling slowly in the presence of the reducing atmosphere, separating the formed compound of barium and then heating the remainder to decompose the sulphydrate and form a sulphide of the alkali metal.

In testimony whereof we have signed our names to this specification.

GASTON DE BÉTHUNE.
ROBERT VAHRENKAMPF.